US010590835B2

(12) United States Patent
Boehn

(10) Patent No.: US 10,590,835 B2
(45) Date of Patent: Mar. 17, 2020

(54) SUPERCHARGER

(71) Applicant: ESS Engineering A/S, Aremark (NO)

(72) Inventor: Asbjoern Boehn, Chandler, AZ (US)

(73) Assignee: ESS ENGINEERING A/S, Aremark (NO)

( * ) Notice: Subject to any disclaimer, the term of this patent is extended or adjusted under 35 U.S.C. 154(b) by 256 days.

(21) Appl. No.: 15/665,053

(22) Filed: Jul. 31, 2017

(65) Prior Publication Data
US 2019/0032546 A1    Jan. 31, 2019

(51) Int. Cl.
| | |
|---|---|
| *F02B 33/38* | (2006.01) |
| *F16H 57/023* | (2012.01) |
| *F02B 29/04* | (2006.01) |
| *F16H 57/04* | (2010.01) |
| *F02D 9/10* | (2006.01) |

(52) U.S. Cl.
CPC .......... *F02B 33/38* (2013.01); *F02B 29/0462* (2013.01); *F16H 57/023* (2013.01); *F16H 57/0439* (2013.01); *F02D 9/1045* (2013.01); *F05D 2220/40* (2013.01); *F16H 2057/0235* (2013.01)

(58) Field of Classification Search
CPC .... F02B 29/0462; F02B 33/38; F02D 9/1045; F05D 2220/40; F16H 2057/0235; F16H 57/023; F16H 57/0439
See application file for complete search history.

(56) References Cited

U.S. PATENT DOCUMENTS

| | | | | |
|---|---|---|---|---|
| 3,664,001 | A * | 5/1972 | Pilarczyk | F04D 29/4206 29/888.021 |
| 4,676,717 | A * | 6/1987 | Willyard, Jr. | F01D 9/026 29/402.08 |
| 4,691,423 | A * | 9/1987 | Willyard, Jr. | F01D 9/026 29/402.06 |
| 5,887,576 | A | 3/1999 | Wheeler, Jr. | |
| 7,568,338 | B2 * | 8/2009 | Noelle | F01D 9/042 415/199.1 |

(Continued)

FOREIGN PATENT DOCUMENTS

| | | |
|---|---|---|
| JP | 2003106299 A | 4/2003 |
| KR | 1020160082513 A | 7/2016 |

OTHER PUBLICATIONS

International Search Report for International Application No. PCT/US18/44503, dated Nov. 28, 2018, 3 pages.

(Continued)

*Primary Examiner* — Jesse S Bogue
(74) *Attorney, Agent, or Firm* — Greenberg Traurig, LLP

(57) ABSTRACT

Embodiments of the invention provide a supercharger including a housing with a scroll-like upper housing at one end and a gear housing at an opposite end, and an output aperture defined by the upper housing. Some embodiments include a supercharger that has a compression chamber that is at least partially surrounded by at least a portion of the upper housing. The supercharger includes an impeller at least partially positioned in the compression chamber, and a variable or interchangeable inlet extending from the housing that defines an inlet aperture fluidly coupled to the compression chamber. Some embodiments include an anti-backlash gear assembly coupled to an impeller gear of the impeller.

20 Claims, 17 Drawing Sheets

(56) References Cited

U.S. PATENT DOCUMENTS

| | | | | |
|---|---|---|---|---|
| 8,067,844 | B2* | 11/2011 | Dolton | F02B 37/225 |
| | | | | 290/40 R |
| 9,010,209 | B2* | 4/2015 | Murphy | F16H 55/18 |
| | | | | 123/90.31 |
| 9,188,129 | B2* | 11/2015 | Walter | F01D 25/24 |
| 9,777,775 | B2* | 10/2017 | van Lieshout | F16D 3/10 |
| 10,233,946 | B2* | 3/2019 | Chaggar | F04D 29/624 |
| 10,273,965 | B2* | 4/2019 | Schwarz | F01D 17/146 |
| 2007/0186717 | A1* | 8/2007 | Chapelain | B62D 1/105 |
| | | | | 74/552 |
| 2010/0329854 | A1 | 12/2010 | Middlebrook | |
| 2016/0069302 | A1 | 3/2016 | Tabata | |
| 2016/0208684 | A1* | 7/2016 | Naruoka | F02B 39/04 |
| 2016/0305453 | A1* | 10/2016 | Burgess | F02B 37/12 |
| 2017/0191502 | A1 | 7/2017 | Ozaki | |

OTHER PUBLICATIONS

Written Opinion for International Application No. PCT/US18/44503, dated Nov. 28, 2018, 11 pages.

\* cited by examiner

SUPERCHARGER

BACKGROUND

Superchargers increase airflow to an engine that powers the supercharger. The increased airflow enables the engine to burn more fuel, which results in a commensurate increase in engine power. For example, a centrifugal supercharger uses a small impeller driven by the engine to draw air into the supercharger from a fill side, compress the air in a compression chamber, and feed compressed air into the engine's combustion chamber via a discharge side. On most conventional superchargers, the pressure at the fill side is typically fixed, and does not allow for variations to optimize volumetric and thermal efficiency for specific applications. Internal lubrication of gearing involving transfer of power from the engine to the impeller is often sub-optimal and can affect longevity.

SUMMARY

Some embodiments include a supercharger comprising housing including a scroll-like upper housing at one end and a gear housing at an opposite end, and an output aperture defined by the upper housing. Some embodiments include a compression chamber at least partially surrounded by at least a portion of the upper housing, and an impeller at least partially positioned in the compression chamber. Some embodiments include a variable or interchangeable inlet extending from the housing, where the inlet defines an inlet aperture fluidly coupled to the compression chamber.

In some embodiments, the inlet is defined by an interchangeable inlet constrictor. In some embodiments, the inlet constrictor comprises an inner wall defining an inlet region and outlet region, and the slope of the inner wall is defined by an angle from a plane parallel with the opening of the outlet region. In some embodiments, the slope is about 78°. In other embodiments, the slope is less than 90°.

In some embodiments of the invention, the impeller is coupled to or integral with an impeller shaft coupled to or integral with an impeller gear positioned adjacent at least one oil guide. In some embodiments, the at least one oil guide comprises a base wall coupled to or extending from the gear housing towards the upper housing. In some further embodiments, the base wall includes one or more coupled guide walls extending away from the gear housing, where at least one of the one or more coupled guide walls at least partially surrounds the impeller gear. Some embodiments include an anti-backlash gear assembly coupled to a gear of the impeller.

Some embodiments include a supercharger comprising a housing including an output aperture, and a compression chamber at least partially surrounded by at least a portion of the housing. Some embodiments include an impeller at least partially positioned in the compression chamber that is coupled to or including an impeller shaft including an impeller gear. Some embodiments include a variable or interchangeable inlet constrictor defining an inlet aperture fluidly coupled to the compression chamber.

In some embodiments, the inlet constrictor is coupled to or includes an edge lip defining an inlet diameter of the inlet aperture. In some embodiments, the inlet constrictor includes an outlet region comprising an aperture with an outlet diameter, where the outlet diameter is circumferentially defined by a coupling between a bottom surface and an inner wall of the inlet constrictor.

In some embodiments, the inner wall is sloped by an angle from a plane parallel with the opening of the outlet region. In some embodiments, the angle is about 78°. In some further embodiments, the angle is less than 90°.

Some embodiments include a supercharger assembly comprising a housing including an output aperture, and a compression chamber at least partially surrounded by at least a portion of the housing. Some embodiments include an impeller at least partially positioned in the compression chamber that is coupled to or including an impeller shaft including a coupled or integrated impeller gear. Some embodiments include an anti-backlash gear assembly coupled to the impeller gear of the impeller.

Some embodiments include an inlet aperture defined by an interchangeable inlet constrictor coupled to an inlet wall of the inlet aperture, where the inlet constrictor comprises an inner diameter defining an inlet region at one end and an outlet diameter at an opposite end. In some embodiments, the inlet constrictor is configured to be swapped with another inlet constrictor comprising a different inner diameter. Further, some embodiments of the assembly include at least one oil guide proximate the impeller gear.

In some embodiments, the at least one oil guide comprises a curved wall coupled to at least a portion of the housing and at least partially surrounding the impeller gear. In some embodiments, the at least one oil guide comprises one or more coupled guide walls at least partially surrounding the impeller gear. In some further embodiments, the inlet constrictor comprises a threaded outer surface comprising a thread complementary to a thread of the inlet wall. In some embodiments, the inner diameter is smaller than the outlet diameter.

DETAILED DESCRIPTION

Figure 1:
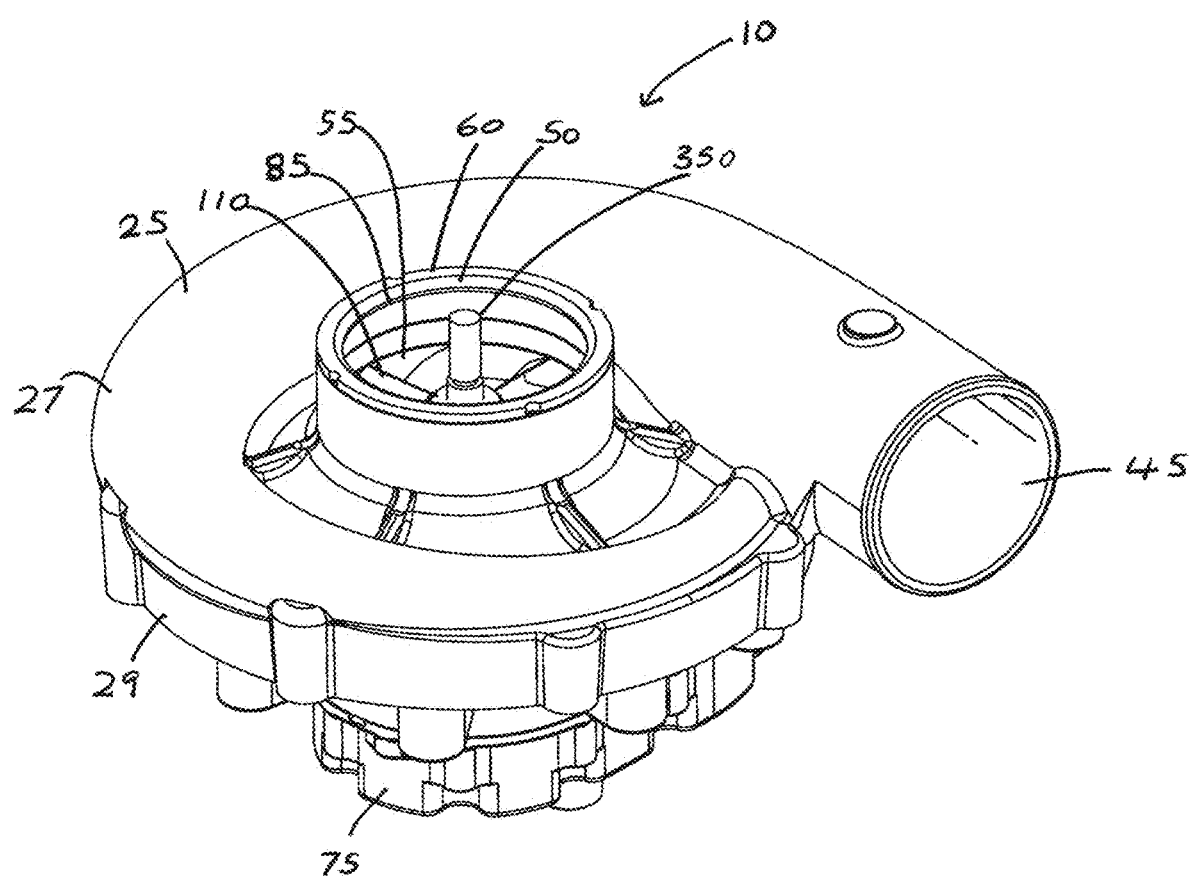
FIG. 1 illustrates a front perspective view of a supercharger in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates a front perspective view of a supercharger 10 in accordance with some embodiments of the invention. In some embodiments, the supercharger 10 can comprise a housing 25 including a upper housing 27 at one end and a gear housing 75 at an opposite end. Further, lower housing 29 can be positioned coupled to and between the upper housing 27 and the gear housing 75. The housing 25 can include a variety of assemblies and components to enable the supercharger 10 to provide compressed gas or fluid (e.g., such as compressed air). In some embodiments, any ambient air flowing into the housing 25 can be compressed within the housing 25 and fed or flowed out of the housing 25 as compressed air. In some embodiments, the any ambient air flowing into the housing 25 can be compressed within the housing 25 and fed into an engine to aid in increasing the power output of the engine. In some embodiments of the invention, the supercharger 10 can include an inlet 50 through which ambient air can flow into a compression chamber 55 in the housing 25.

Figure 2:
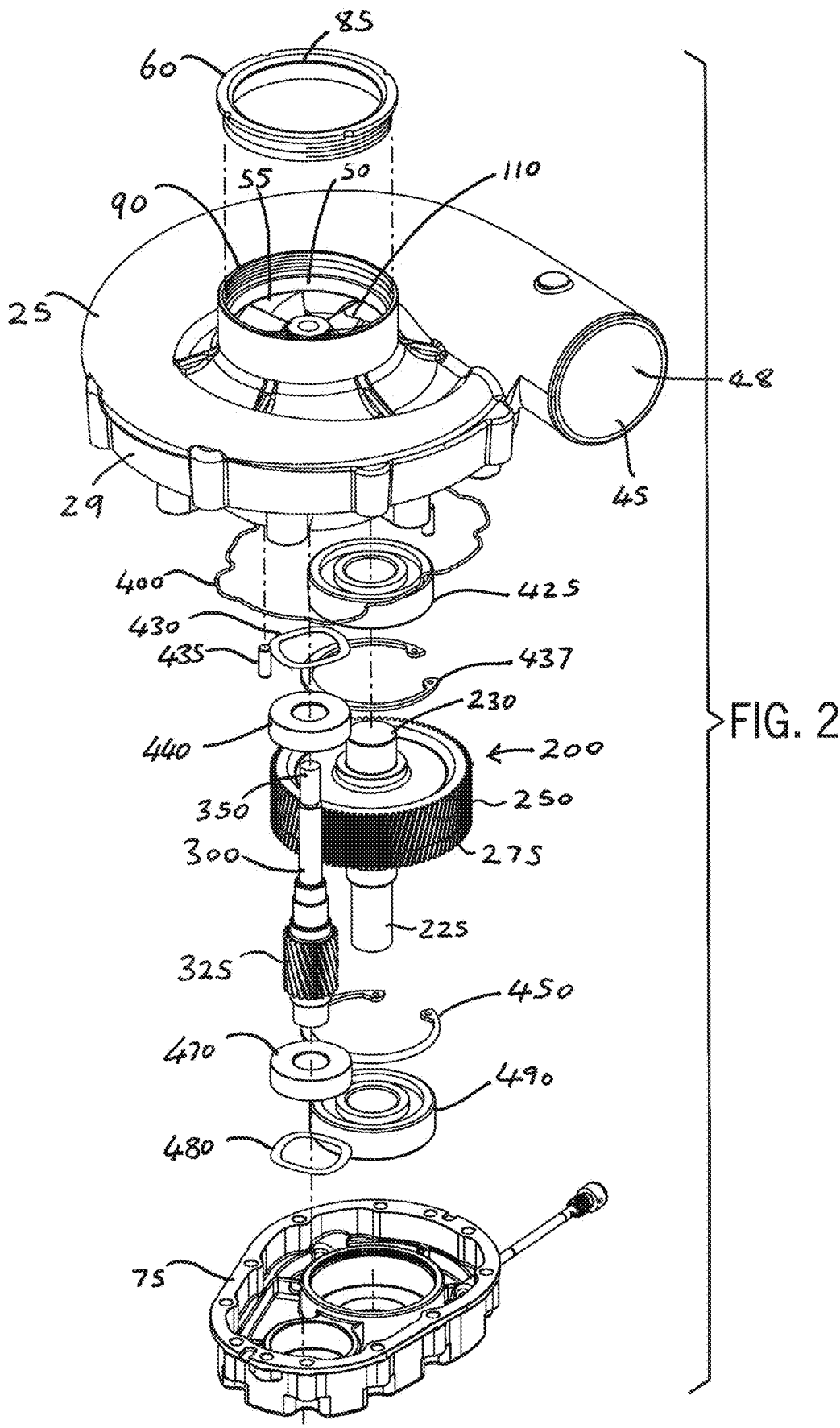
FIG. 2 illustrates an exploded assembly top view of the supercharger of FIG. 1 in accordance with some embodiments of the invention.
Figure 3:
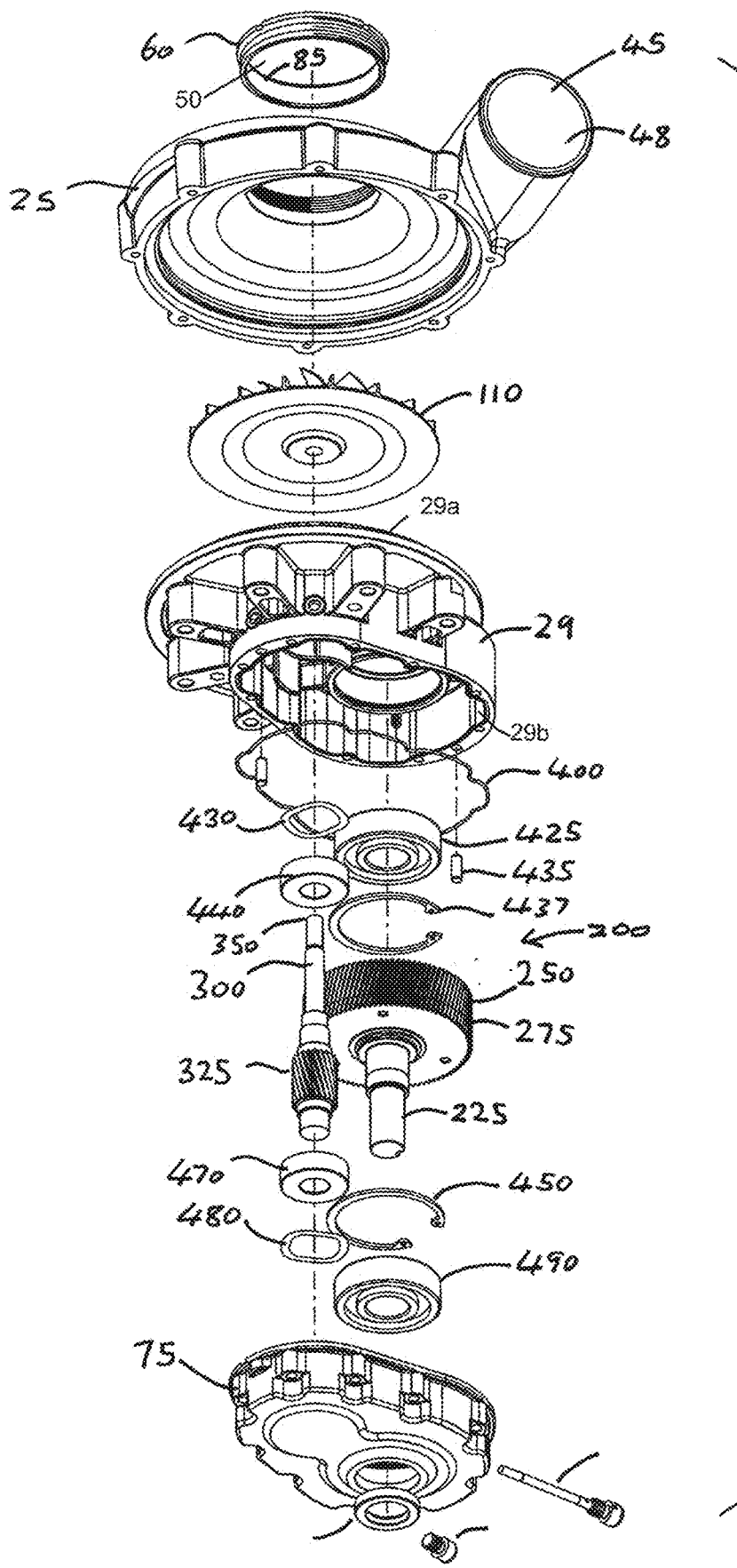
FIG. 3 illustrates an exploded assembly bottom view of the supercharger of FIG. 1 in accordance with some embodiments of the invention.

In some embodiments, the supercharger 10 can include an impeller 110 mounted, coupled, or integrated with an impeller shaft 350. The impeller 110 and associated drive components can be seen in more detail in the exploded assembly views of FIGS. 2 and 3. For example, FIG. 2 illustrates an exploded assembly top view of the supercharger of FIG. 1 in accordance with some embodiments of the invention. FIG. 3 illustrates an exploded assembly bottom view of the supercharger of FIG. 1 in accordance with some embodiments of the invention. In some embodiments, the inlet 50 can be defined by one or more inlets rings 60. In some embodiments of the invention, the diameter of the inlet 50 can be varied using one or more inlet rings 60 of different diameters. For example, in some embodiments, the inlet 50 can include a variable inlet surface 85 that can be used to reduce, restrict or throttle air flow into the inlet 50. Further details of the various embodiments of inlet rings 60 are shown and described below in relation to FIGS. 16-20.

In some embodiments of the invention, the impeller 110 can be mounted and/or supported in the housing 25 by lower housing 29 (shown from a bottom side in FIG. 3, but shown removed from the exploded assembly view of FIG. 2 for clarity purposes). For example, in some embodiments, the impeller 110 can be mounted into the upper end 29a of the lower housing 29. Further, in some embodiments, the impeller 110 can be coupled, or integrated with an impeller shaft 350 which can extend from the lower end 29b and through the upper end 29a of the lower housing 29.

In some embodiments, the impeller shaft 350 can be configured to be driven by a drive gear assembly to enable powered rotation of the impeller 110. In some embodiments of the invention, the impeller shaft 350 can comprise a central shaft 300 with a coupled or integrated impeller gear 325. In some embodiments of the invention, the coupled or integrated impeller gear 325 can be position in the housing 25 coupled to one or more gears of an input gear assembly 200.

In some embodiments of the invention, the impeller shaft 350 and input gear assembly 200 can be positioned into the lower end 29b of the lower housing 29. Various components can be included to enable the impeller shaft 350 and input gear assembly 200 to be assembled into the lower housing 29. Some components include components for coupling one component to another component such as a fasteners or clips, and other components include components for providing seals. Still further, some other components can facilitate movement of shafts and/or gears such as bearings or bearing assemblies. For example, some embodiments include gasket 400 positioned and shaped to form a gasket seal between the lower end 29b of the lower housing 29 and top surface 77 of the gear housing 75. Some further embodiments include a bearing assembly 425 configured to couple to the drive shaft 230. Further, some embodiments include gasket 430 positioned for coupling to the bearing assembly 440. In some embodiments, a fastener 435 can be positioned coupled into the lower housing. Further, some embodiments include a clip 437 positioned between the bearing assembly 425 and input gear 250, and/or clip 450 positioned adjacent the bearing assembly 490, and/or gasket 480 positioned adjacent the bearing assembly 470.

Figure 5:
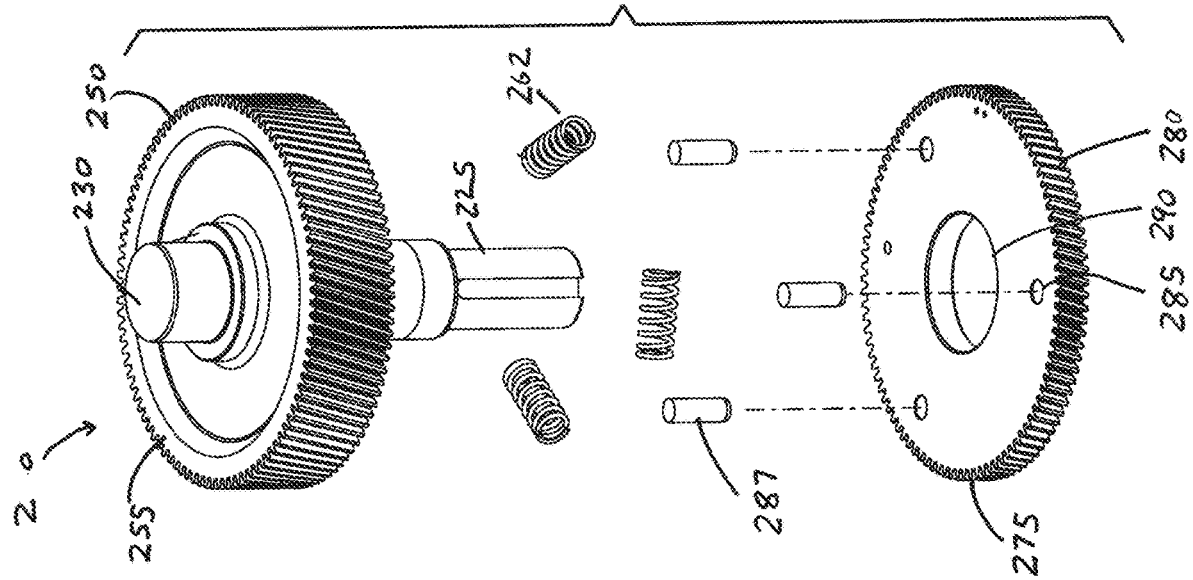
FIG. 5 illustrates an input gear and anti-backlash gear assembly top view in accordance with some embodiments of the invention.
Figure 4:
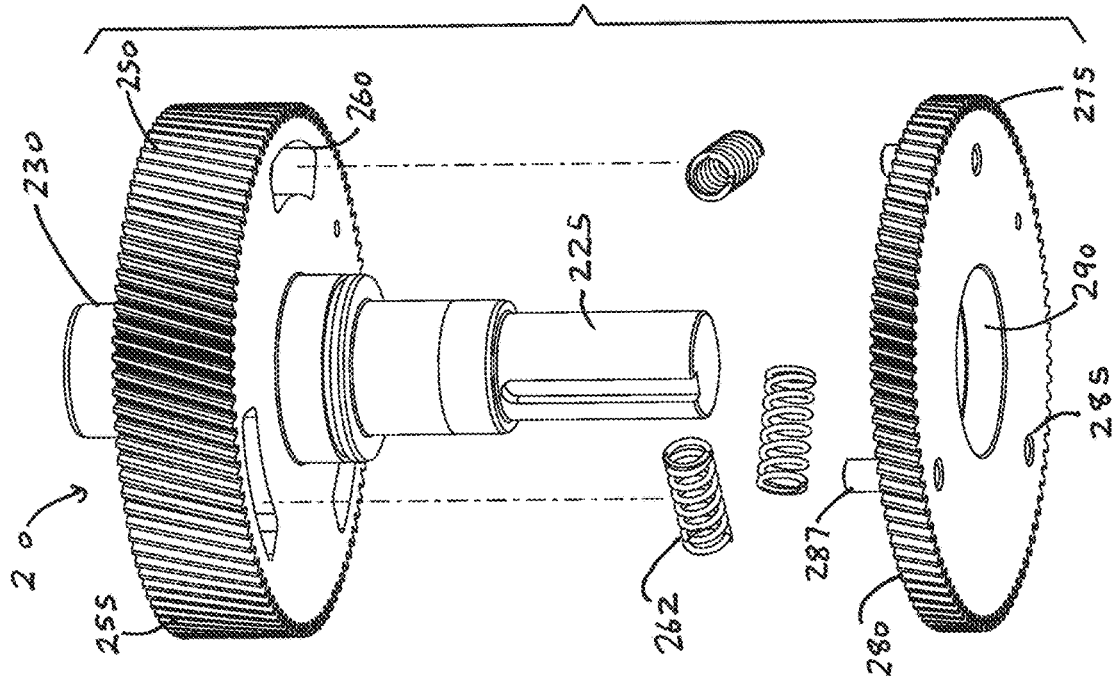
FIG. 4 illustrates an input gear and anti-backlash gear assembly bottom view in accordance with some embodiments of the invention.
Figure 6:
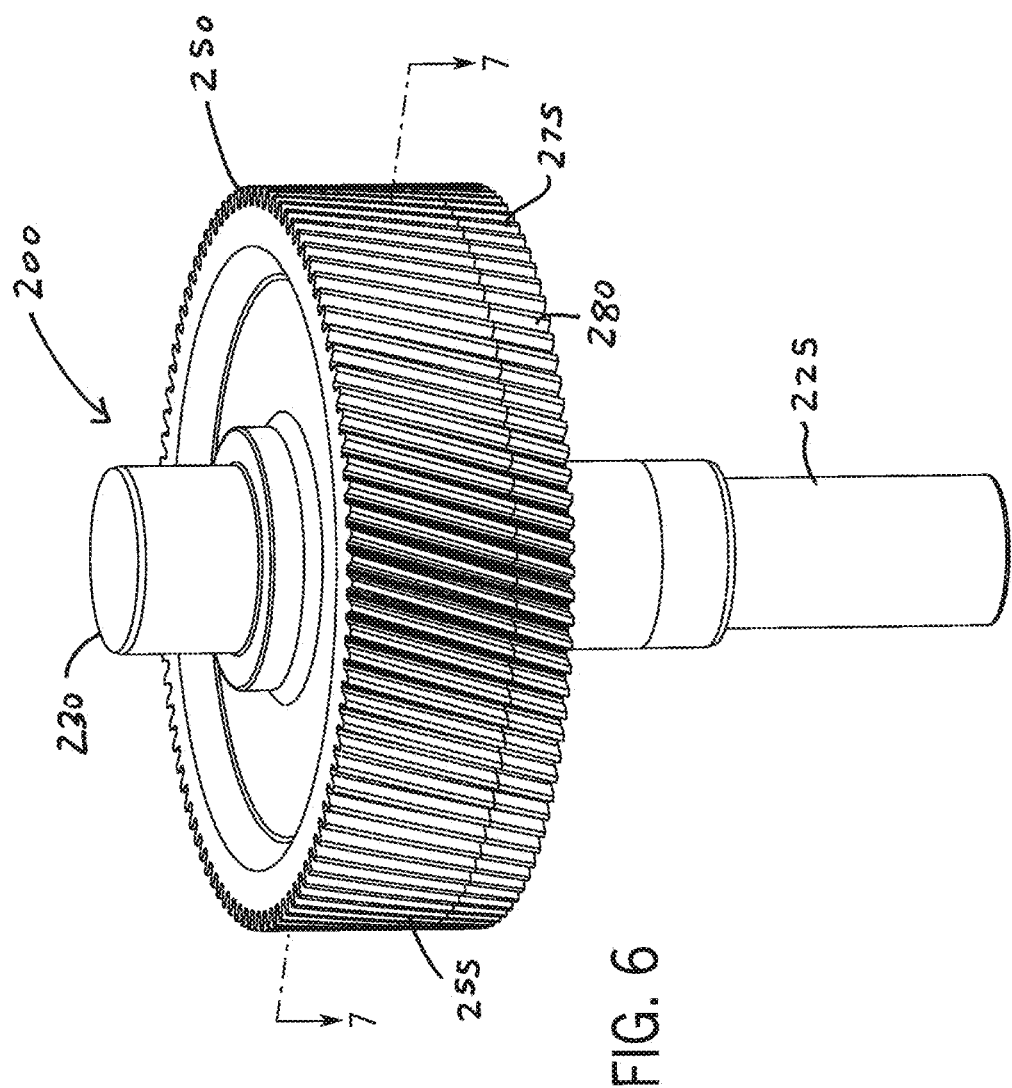
FIG. 6 illustrates a top perspective view of an input gear in accordance with some embodiments of the invention.
Figure 7:
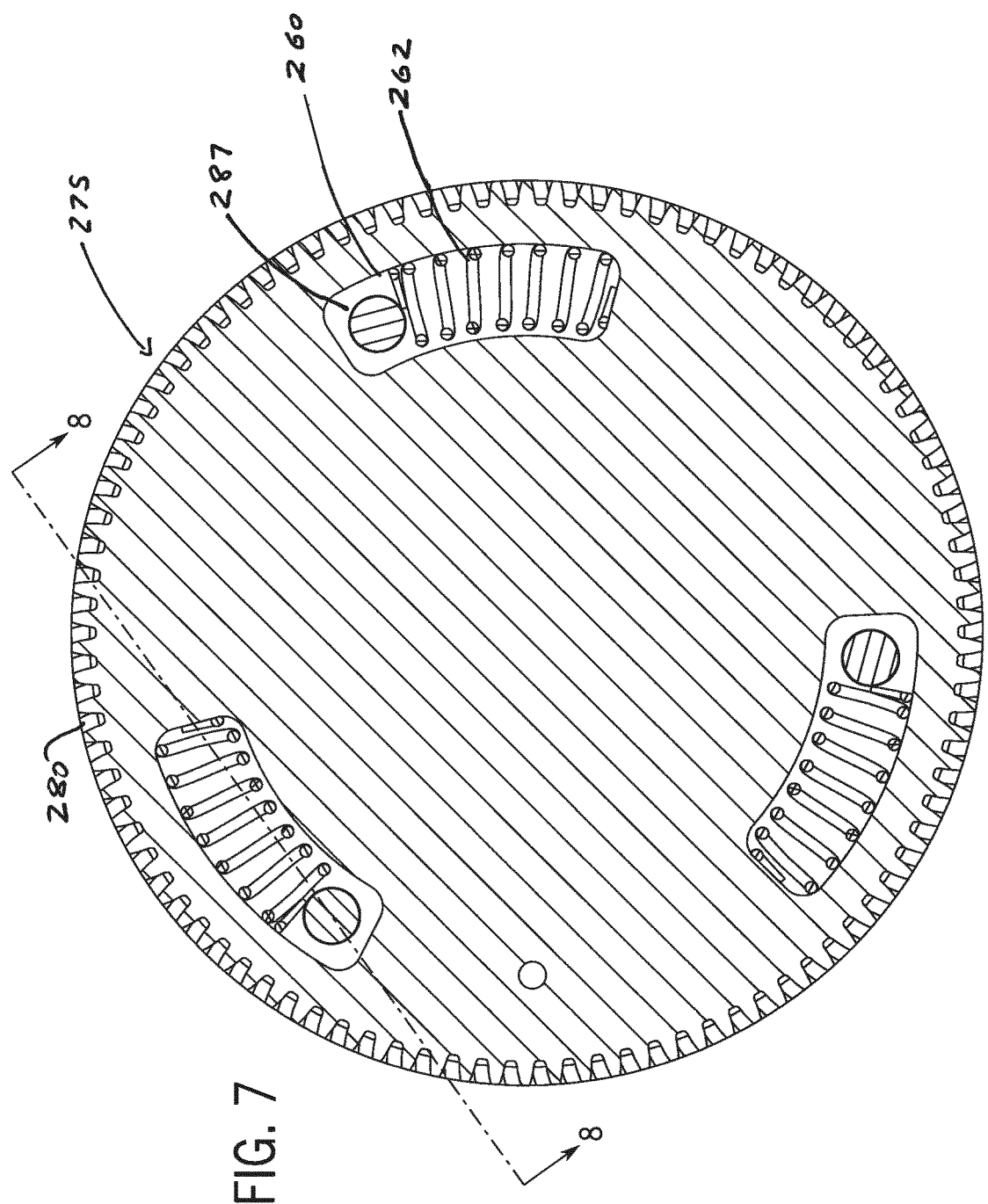
FIG. 7 illustrates a cross-sectional view through cut-line 7 of the input gear of FIG. 6 in accordance with some embodiments of the invention.
Figure 8:
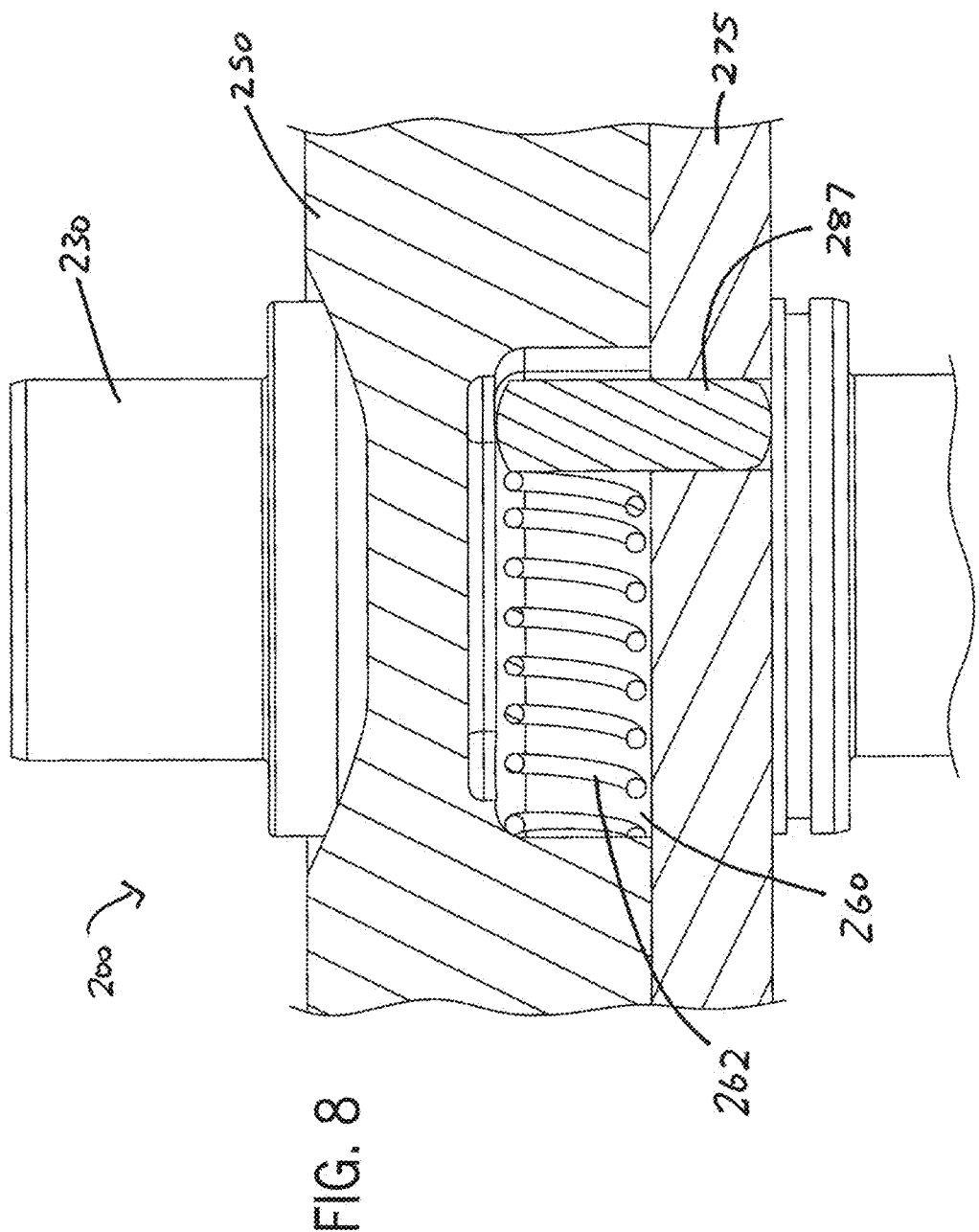
FIG. 8 illustrates a cross-sectional view through cut-line 8 of the input gear of FIG. 6 in accordance with some embodiments of the invention.

Some embodiments include assemblies to reduce backlash and gear noise associated with changes in torque. Gear backlash can occur due to a gap between meshing gear contact surfaces (due to design tolerance and assembly and long-term wear of gear surfaces). For example, some embodiments include a second adjacent, minor, or sub-gear that can be forced toward the rotational direction of the drive gear. The main or primary gear can be secured to the drive shaft, while the sub-gear can be mounted adjacent to the main gear (e.g., such as on a bushing). In some embodiments, the force can be applied using an assembly of springs that interconnects the two gears that can apply a spring-bias so that the teeth of the two gears can be out of alignment with respect to each other. In some anti-backlash gear assemblies, the combined out-of-alignment space of two misaligned teeth of each gear can be substantially the same as the space between two adjacent teeth on the gear with which the anti-backlash gears are meshed (e.g., such as impeller gear 325). For example, the input gear assembly 200 is shown further in FIGS. 4-7, where FIG. 4 illustrates an input gear 250 and a coupled anti-backlash gear 275 assembly bottom view in accordance with some embodiments of the invention, and FIG. 5 illustrates an input gear 250 and anti-backlash gear 275 assembly top view in accordance with some embodiments of the invention. FIG. 7 illustrates a cross-sectional view through cut-line 7 of the input gear of FIG. 6 in accordance with some embodiments of the invention, and FIG. 6 illustrates a top perspective view of an input gear in accordance with some embodiments of the invention. Further, FIG. 8 illustrates a cross-sectional view through cut-line 8 of the input gear of FIG. 6 in accordance with some embodiments of the invention. In some embodiments of the invention, the input gear assembly 200 can include anti-backlash gear 275 positioned coupled to the input gear 250. The assembly 200 can be assembled by passing the terminal end 225 of the drive shaft 230 through shaft aperture 290 of the gear 275. Some embodiments include an input gear assembly 200 comprising a drive shaft 230 coupled to or integrated with input gear 250 comprising teeth 255, and an anti-backlash gear 275 comprising teeth 280. For some example, in some embodiments, the input gear 250 can include the three evenly circumferentially-spaced recesses 260 for positioning of biasing springs. In one non-limiting example, springs 262 can be positioned in the recesses 260 and coupled to pins 287 that are mounted into apertures 285. This assembly can enable movement of the anti-backlash gear 275 relative to the input gear 250. For example, as the anti-backlash gear 275 rotates relative to the input gear 250, the pins 287 can compress the springs 262 when the anti-backlash gear 275 rotates relative to the input gear 250 in one direction. Further, as the anti-backlash gear 275 rotates relative to the input gear 250 in an opposite direction, the pins 287 can release the compressed springs 262 when the anti-backlash gear 275 rotates relative to the input gear 250 in the other direction.

As a results, in some embodiments, the movement of the anti-backlash gear 275 relative to the input gear 250 can enable the meshing of the teeth 255 and/or the teeth 280 with the integrated impeller gear 325 with minimal noise, chatter, misalignment, etc.

FIG. 7 illustrates a cross-sectional view through cut-line 7 of the input gear of FIG. 6 and shows springs 262 positioned in the recesses 260 and coupled to pins 287. The non-limiting embodiment of FIG. 7 shows the springs 262 are arranged substantially evenly circumferentially spaced in the anti-backlash gear 275. The embodiment shows three springs 262, however it will be readily understood that the anti-backlash gear 275 can include less than three springs 262 or more than three springs 262. The positional relationship of the springs 262 and pins 287 can be seen in FIG. 8 illustrating a cross-sectional view through cut-line 8 of the input gear of FIG. 6 in accordance with some embodiments of the invention.

Figure 10:
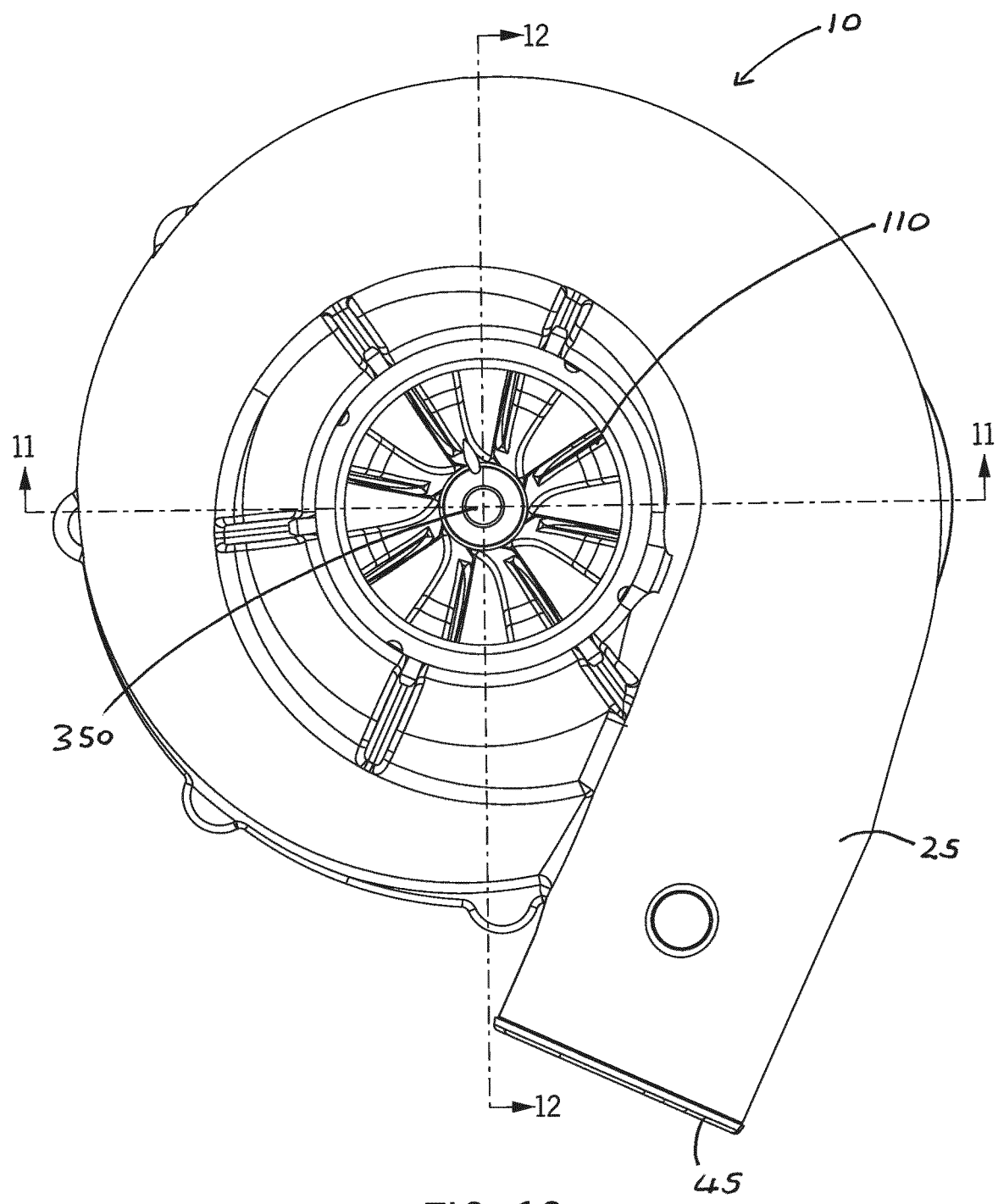
FIG. 10 illustrates a top view of the supercharger of FIG. 1 in accordance with some embodiments of the invention.
Figure 11:
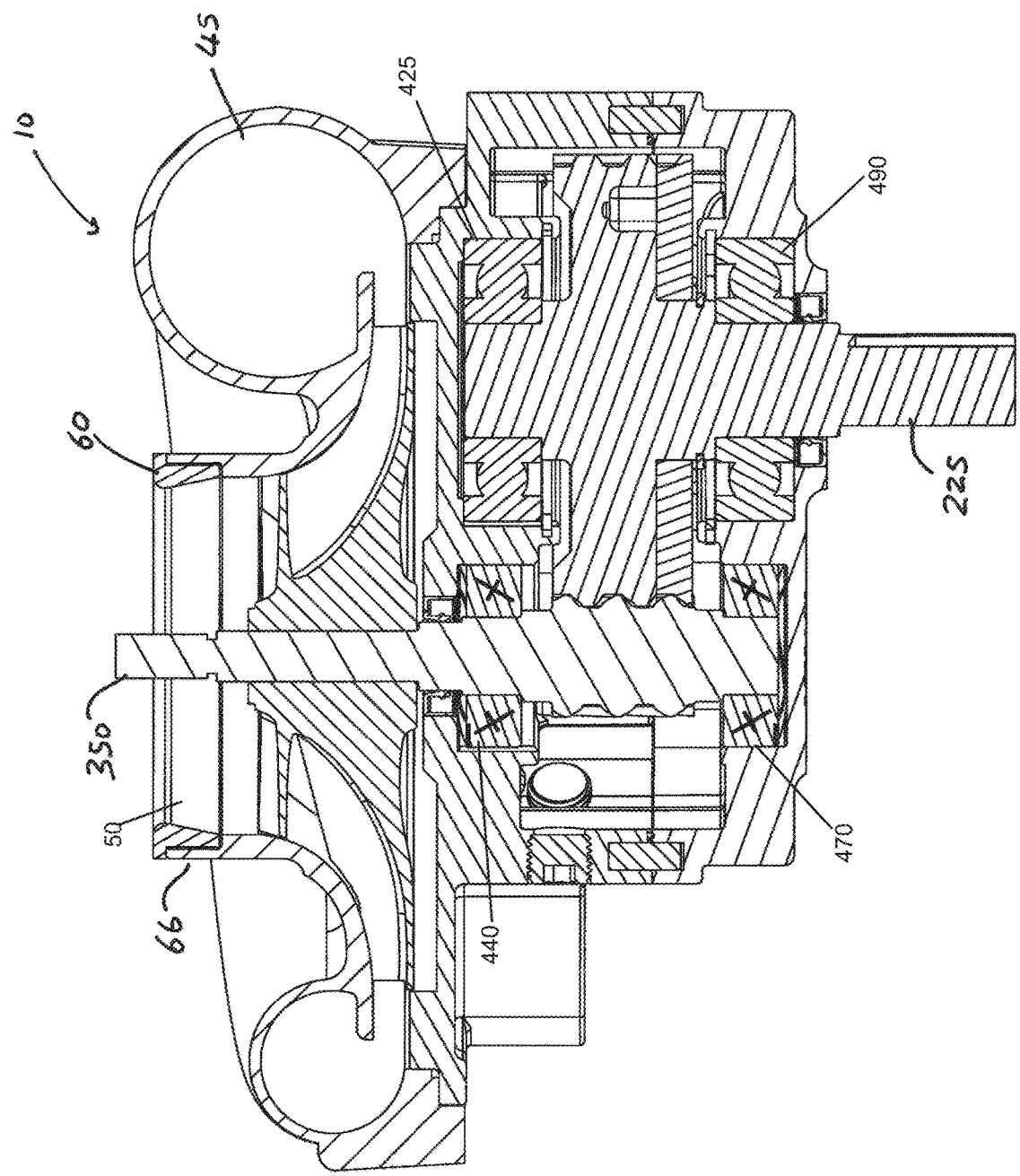
FIG. 11 illustrates a front cross-sectional view of the supercharger of FIG. 1 in accordance with some embodiments of the invention.

FIG. 10 illustrates a top view of the supercharger of FIG. 1 in accordance with some embodiments of the invention. During operation, the impeller 110 can rotate, drawing air into the housing 25 through the inlet 50. At least some of the air can be compressed by the impeller and forced through the housing 25 towards an outlet aperture 45 defined by the housing 25. As shown, some embodiments include a housing 25 that comprises a scroll-like shape. In some embodiments the housing 25 can form part of a centrifugal or centrifugal-type supercharger. In other embodiments, the housing 25 can form part of a screw-type supercharger. In some embodiments, the internal cross-sectional diameter of the housing 25 can progressively increase in size from a region adjacent the impeller 110 within the housing and extending around the housing towards the outlet aperture 45. FIG. 11 illustrates a front cross-sectional view of the supercharger 10 of FIG. 1 in accordance with some embodiments of the invention where the internal cross-sectional diameter of the housing 25 is shown to be smaller on the left side of the image versus the right side, where the region of largest cross-sectional diameter defines the outlet aperture 45.

Figure 12:
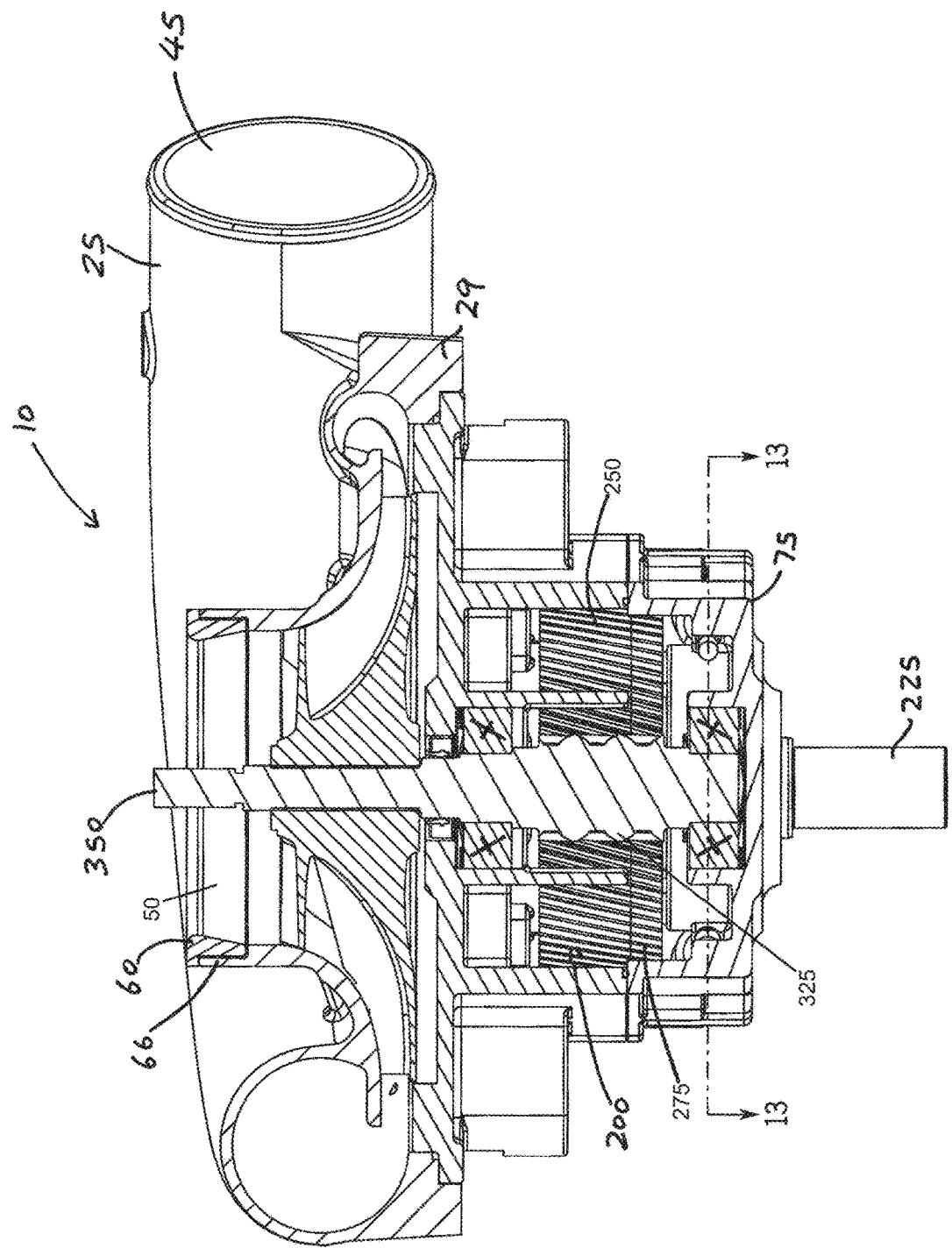
FIG. 12 illustrates a side cross-sectional view of the supercharger of FIG. 1 in accordance with some embodiments of the invention.
Figure 13:
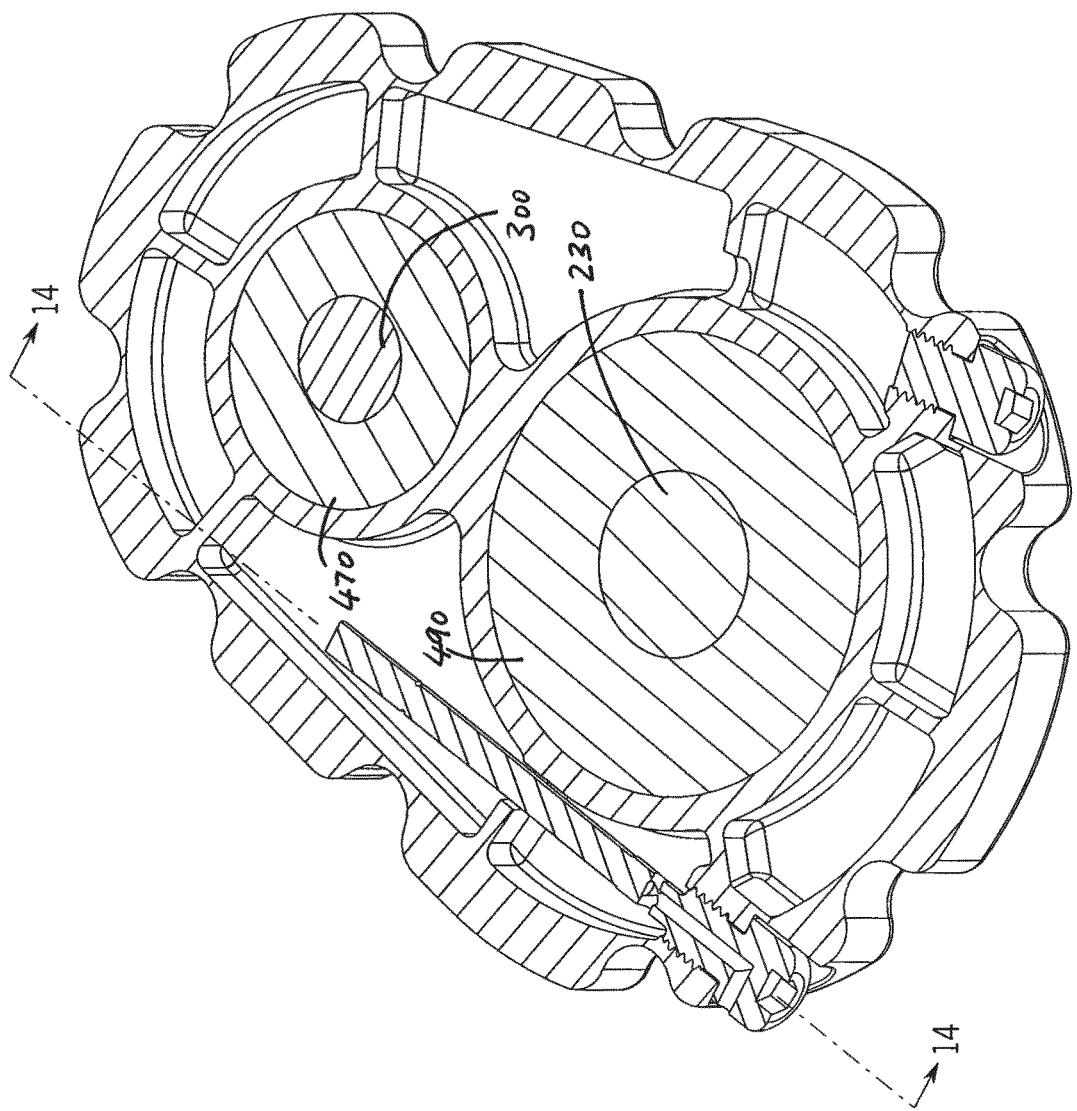
FIG. 13 illustrates a cross-sectional view through cut-line 13 of FIG. 12 in accordance with some embodiments of the invention.
Figure 14:
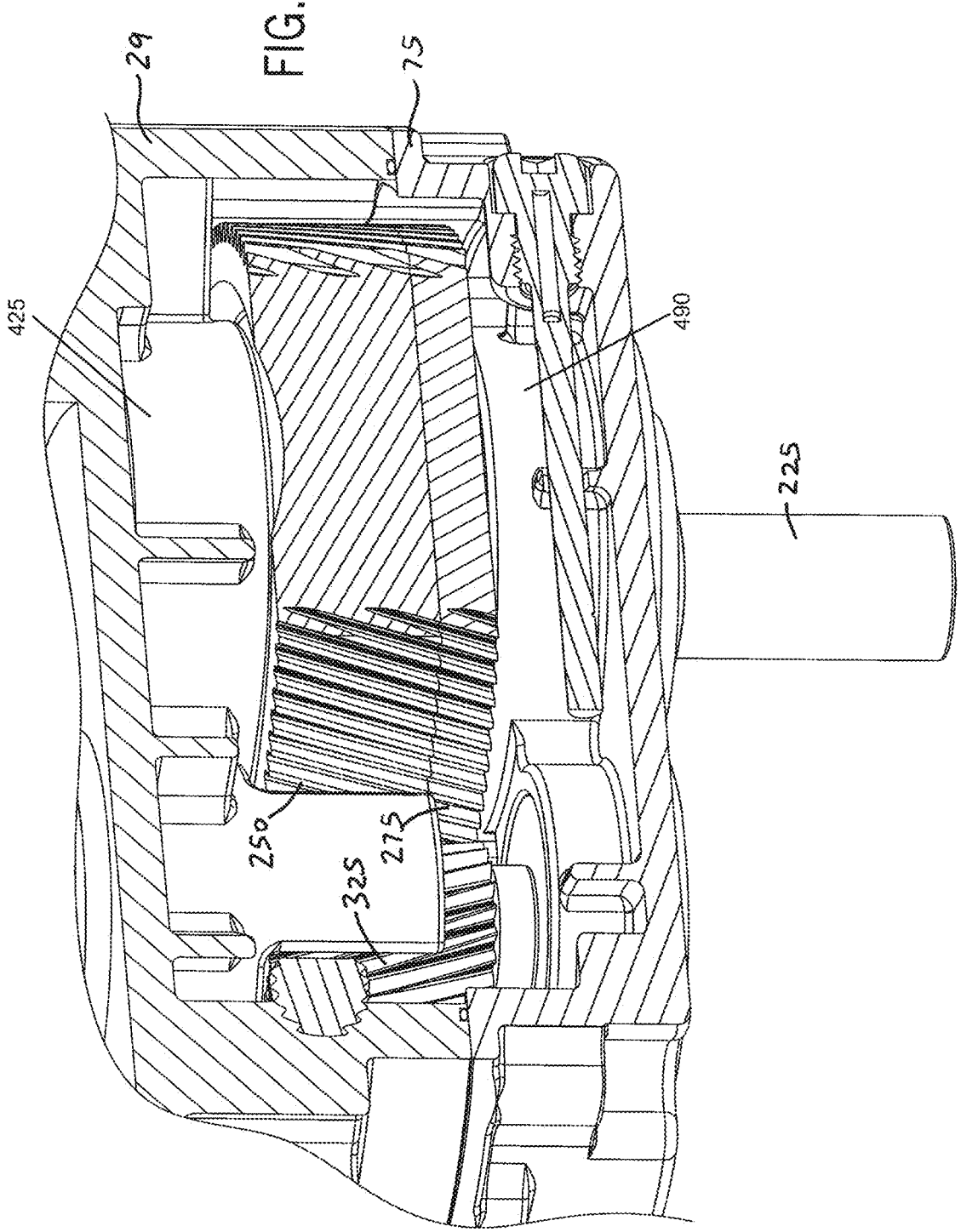
FIG. 14 illustrates a cross-sectional view through cut-line 14 of FIG. 13 in accordance with some embodiments of the invention.

FIG. 12 illustrates a side cross-sectional view of the supercharger of FIG. 1 in accordance with some embodiments of the invention, and FIG. 13 illustrates a cross-sectional view through cut-line 13 of FIG. 12, and shows central shaft 300 of impeller shaft 350 of input gear assembly 200 coupled to bearing assembly 470, and drive shaft 230 coupled to bearing assembly 490. FIG. 14 illustrates a cross-sectional view through cut-line 14 of FIG. 13 in accordance with some embodiments of the invention, and shows the position of the input gear 250 and anti-backlash gear 275 positioned with respect to impeller gear 325. In some embodiments, the input gear assembly 200 can be powered to enable the impeller shaft 350 and impeller 110 to rotate. For example, drive shaft 230 coupled to or integrated with the teeth 255 of the input gear 250 can couple with teeth 280 of the anti-backlash gear 275 to drive transfer power from the drive shaft to the input gear 250 and anti-backlash gear 275.

Figure 15:
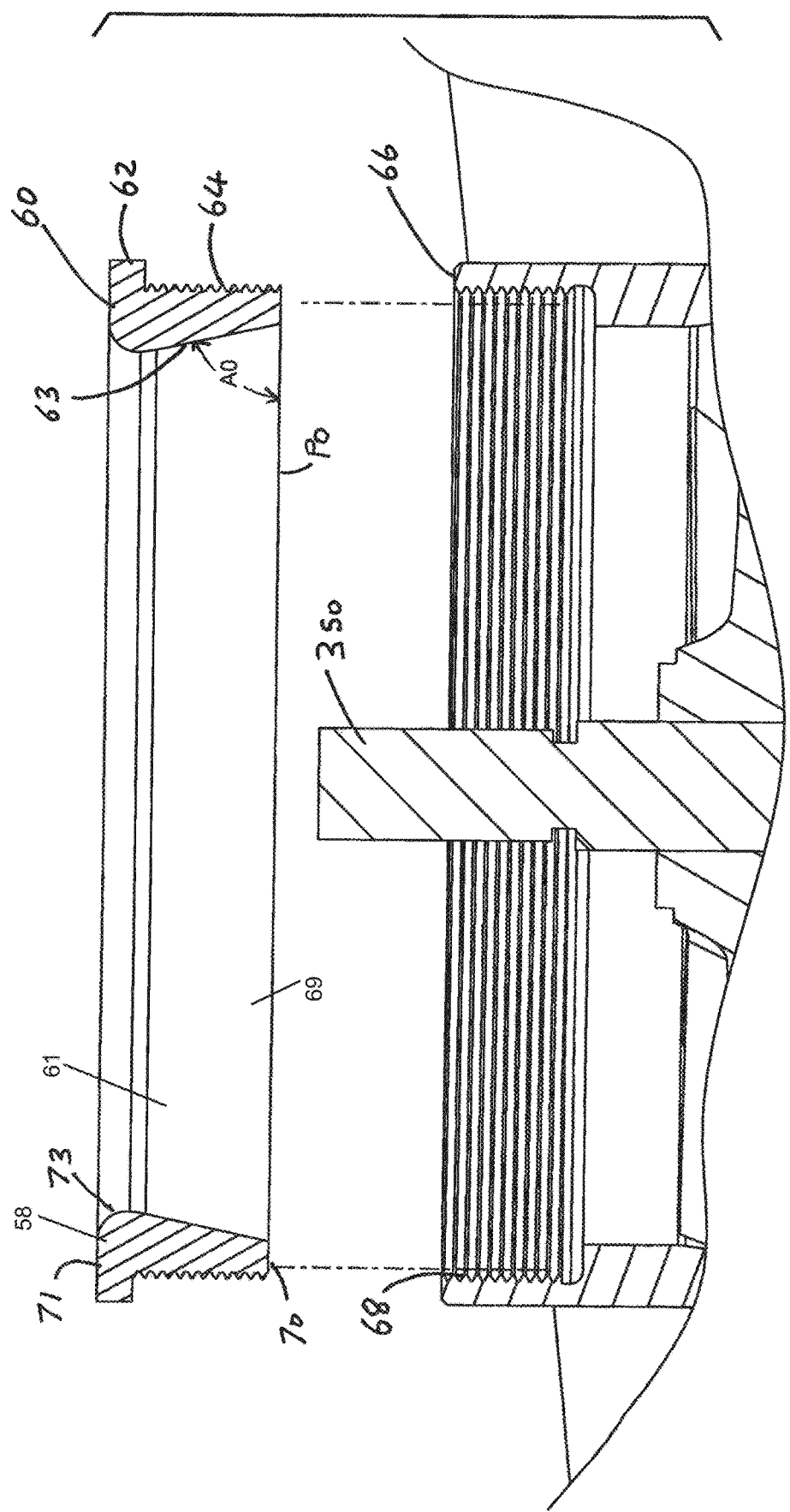
FIG. 15 illustrates a side cross-sectional view of an inlet area of the supercharger of FIG. 1 in accordance with some embodiments of the invention.

FIG. 15 illustrates a side cross-sectional view of an inlet area of the supercharger 10 of FIG. 1 in accordance with some embodiments of the invention. As described earlier, in some embodiments of the invention, the supercharger 10 can include an inlet 50 through which air can flow into compression chamber 55 where the inlet 50 can be defined by one or more inlets rings 60. In some embodiments, inlet constrictor 60 can comprise a main body 58 that can include an inner wall 63 extending from a bottom surface 70 to an edge lip 73 that extends circumferentially around the inlet constrictor 60 and defines an inlet diameter of the main body 58, and the outlet region 69 comprises an aperture with an outlet diameter that is circumferentially defined by the coupling between the bottom surface 70 and the inner wall 63 (i.e., the inner wall 63 defines circular aperture at a point where the inner wall 63 and bottom surface 70 meet). In some embodiments, the edge lip 73 extends from the top surface 71 to the inner wall 63. In some embodiments, the edge lip 73 is coupled to and extends between the top surface 71 and the inner wall 63. In some embodiments, the inner wall 63 includes the edge lip 73. In some embodiments, the inlet diameter of the main body 58 (defined by the edge lip 73) is smaller than the outlet diameter as described above. In other embodiments, the inlet diameter (defined by the edge lip 73) is about equal to the outlet diameter. In some embodiments, the inlet constrictor 60 can include an outlet flange 62 extending outwardly from the main body 58, circumferentially around the inlet region 61. In some embodiments, the inlet constrictor 60 can be a ring or ring-like structure. In some other embodiments, the inlet constrictor 60 can comprise an oval or oval-shaped structure. In some further embodiments, the inlet constrictor 60 can comprise a square or rectangular structure.

Figure 9:
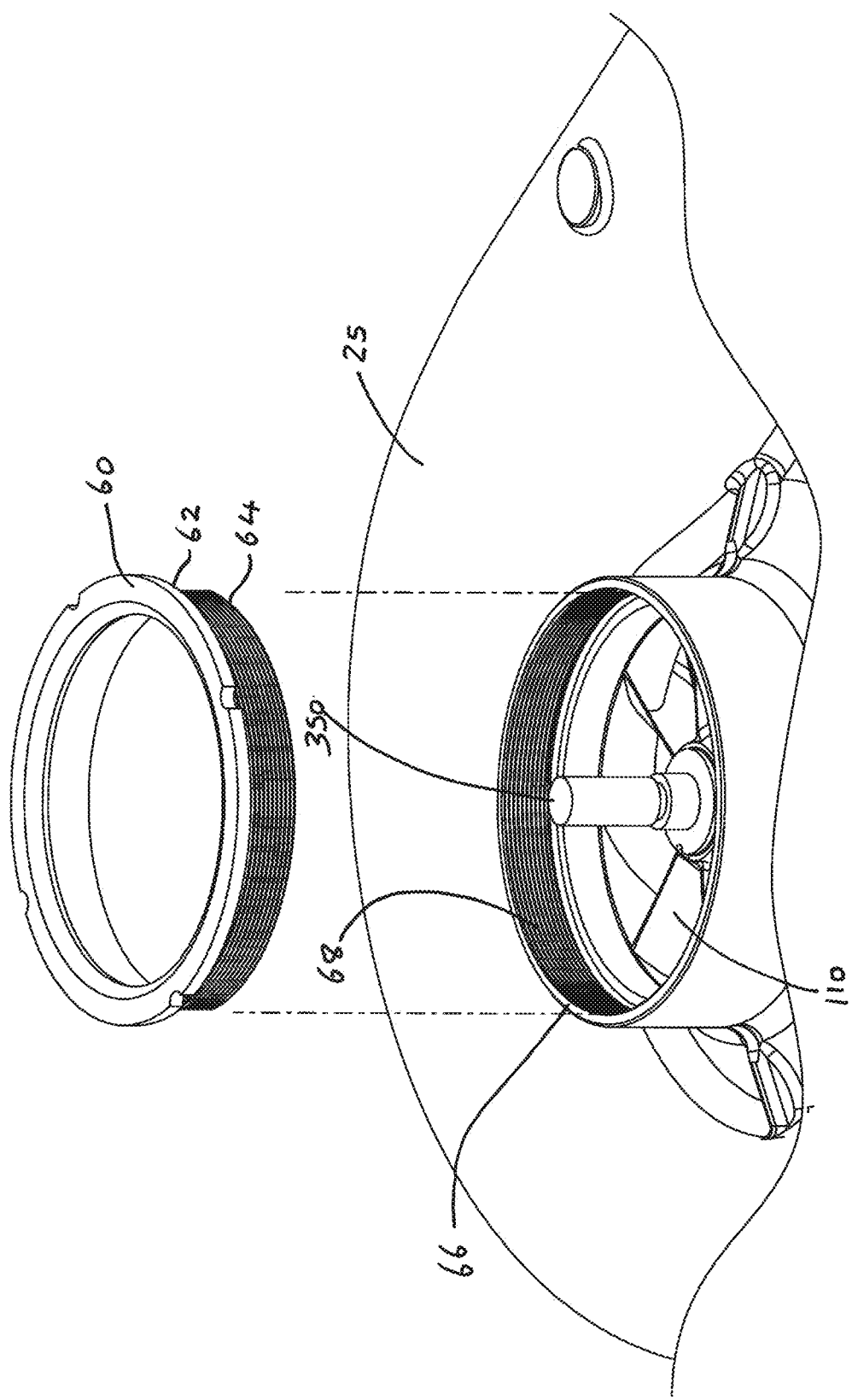
FIG. 9 illustrates a partial cut-away perspective view of the supercharger of FIG. 1 with inlet area reducer (inlet ring) shown in assembly view in accordance with some embodiments of the invention.

FIG. 9 illustrates a partial cut-away perspective view of the supercharger 10 of FIG. 1 with the inlet constrictor 60 shown in assembly view in accordance with some embodiments of the invention. In the non-limiting embodiment shown in FIG. 15, the edge lip 73 comprises a curved or convex surface. In some other embodiments, the edge lip 73 can have a smaller radius of curvature than shown, and in other embodiments, the edge lip 73 can have a larger radius of curvature than shown. Further, in some embodiments, the inlet constrictor 60 can include an inner wall 63 defining an inlet region 61 and outlet region 69. In some embodiments, the inlet constrictor 60 can include an constrictor thread 64 extending around an outer circumference of the main body 58. In some embodiments, the constrictor thread 64 can couple with a complementary inlet wall thread 68 extending circumferentially around the inlet wall 66 and assembled into the supercharger 10.

Figure 16:
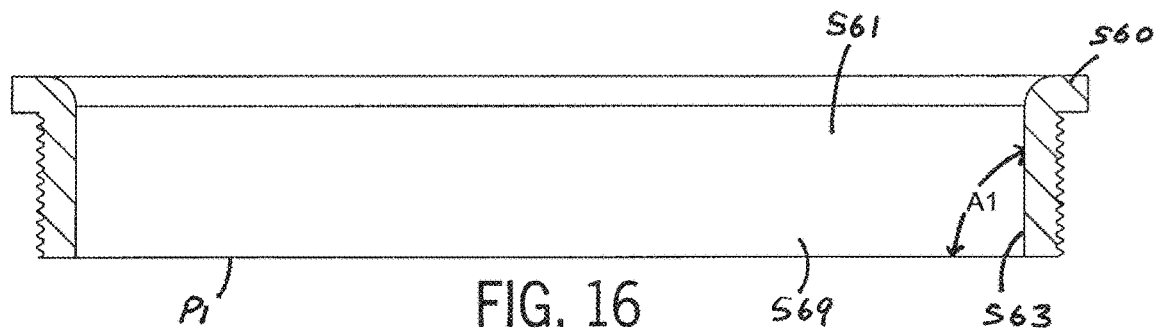
FIGS. 16-20 illustrate side cross-sectional views of inlet area reducers in accordance with some embodiments of the invention.
Figure 17:
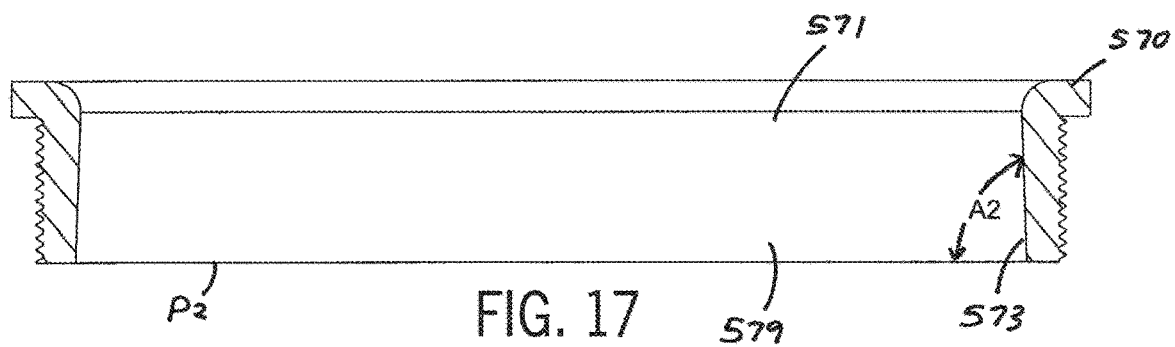
Figure 18:
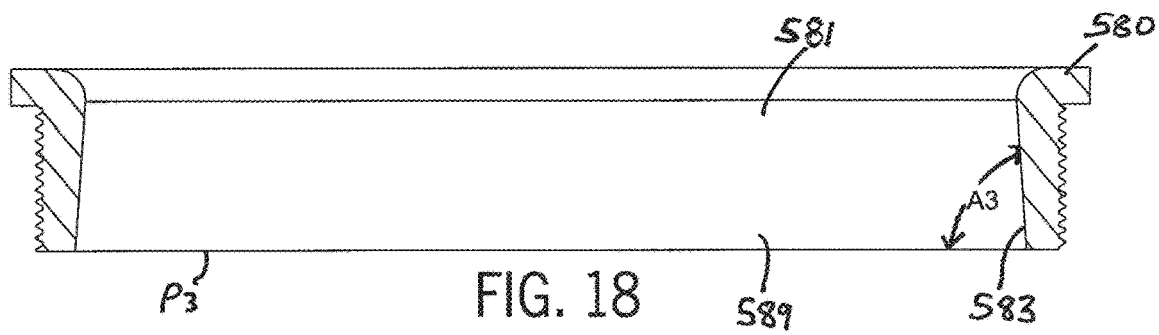
Figure 19:
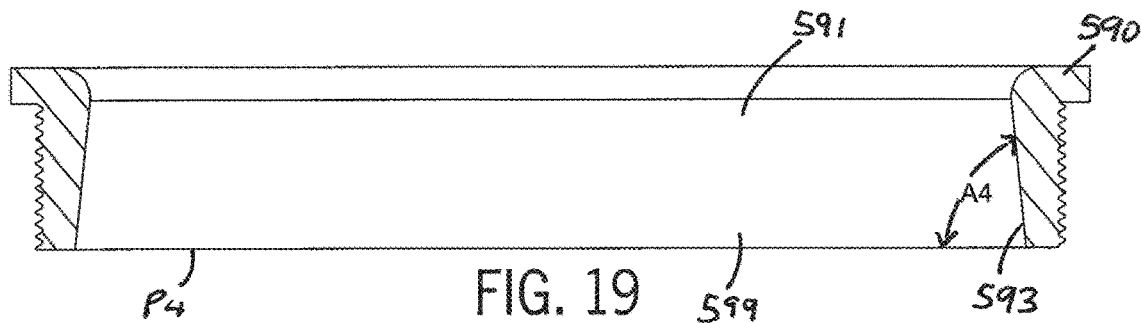
Figure 20:
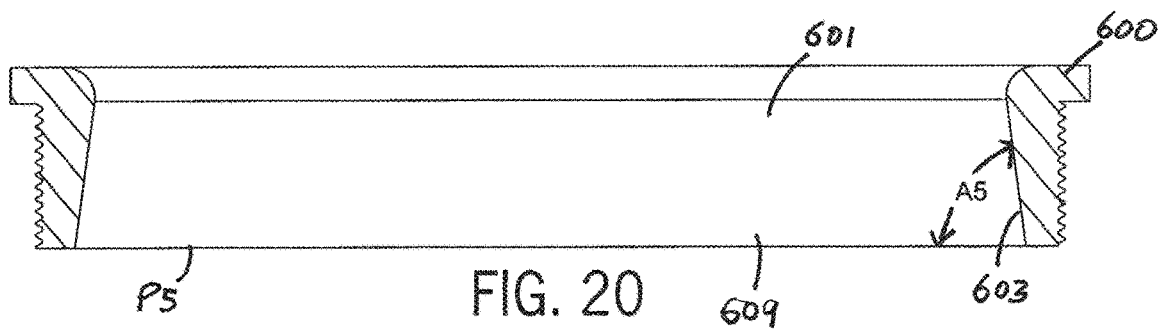

In some embodiments, the slope of the inner wall 63 can be defined by an angle A0 from a plane P0 parallel with the opening of the outlet region 69 (i.e. the plane P0 parallel with the bottom surface 70). For example, in some embodiments, the angle A0 between the inner wall 63 and the plane P0 can be about 78°. FIGS. 16-20 illustrate side cross-sectional views of inlet area reducers in accordance with some embodiments of the invention. For example, FIG. 16 illustrates a side cross-sectional view of inlet area reducer 560 in accordance with some embodiments of the invention. In some embodiments, the inlet constrictor 560 includes inner wall 563 defining an inlet region 561 and outlet region 569. In some embodiments, the slope of the inner wall 563 can be defined by an angle from a plane parallel with the opening of the outlet region 569. For example, in some embodiments, the angle A1 between the inner wall 563 and the plane P1 can be about 90°. In some other embodiments, the slope of the inner wall can be defined by an angle from a plane parallel with the opening of the outlet region that is less than 90°. For example, FIG. 17 illustrates a side cross-sectional view of inlet area reducer 570 in accordance with some embodiments of the invention. Some embodiments include inlet constrictor 570 with an inner wall 573 defining an inlet region 571 and outlet region 579. In some embodiments, the slope of the inner wall 573 can be defined by an angle from a plane parallel with the opening of the outlet region 579. For example, in some embodiments, the angle A2 between the inner wall 573 and the plane P2 can be about 88°. Further, for example, FIG. 18 illustrates a side cross-sectional view of inlet area reducer 580 in accordance with some embodiments of the invention. In some embodiments, the inlet constrictor 580 includes an inner wall 583 defining an inlet region 581 and outlet region 589. In some embodiments, the slope of the inner wall 583 can be defined by an angle from a plane parallel with the opening of the outlet region 589. For example, in some embodiments, the angle A3 between the inner wall 583 and the plane P3 can be between about 86°. Further, for example, FIG. 19 illustrates a side cross-sectional view of inlet area reducer 590 in accordance with some embodiments of the invention. In some embodiments, the inlet constrictor 590 defines an inlet region 591 and outlet region 599 by the inner wall 593. In some embodiments, the slope of the inner wall 593 can be defined by an angle from a plane parallel with the opening of the outlet region 599. For example, in some embodiments, the angle A4 between the inner wall 593 and the plane P4 can be between about 84° Further, for example, FIG. 20 illustrates a side cross-sectional view of inlet area reducer 600 in accordance with some embodiments of the invention. In some embodiments, the inlet reducer 600 defines an inlet region 601 and outlet region 609 by the inner wall 603. In some embodiments, the slope of the inner wall 603 can be defined by an angle from a plane parallel with the opening of the outlet region 609. For example, in some embodiments, the angle A5 between the inner wall 603 and the plane P5 can be between about 82°. One of ordinary skill in the art will recognize that the slope of the inner wall can be defined by an angle from a plane parallel with the opening of the outlet region that is less than 82°. For example, the slope of the inner wall can be defined by an angle from a plane parallel with the opening of the outlet region that is between about 78° and 82°, between about 75° and 78°, and so on. For example, in some embodiments, the slope of the inner wall can be defined by an angle from a plane parallel with the opening of the outlet region that is less than 75°. One of ordinary skill in the art will recognize that in any of the embodiments described above, any one or more of angles A0 to A5 can vary from the values defined based on conventional manufacturing tolerances. For example, in some embodiments, any one or more of angles A0 to A5 can vary by 0.01 degree to 0.1 degree or between 0.01 degree and 0.5 degree based on manufacturing tolerances. In other embodiments, any of the embodiments described above with respect to angles A0 to A5 can vary from the values defined based on specifications of the supercharger. For example, in some embodiments, any one or more of angles A0 to A5 can vary by between 0.1 and 0.5 degree or between 0.5 and 1 degree or more.

Figure 21:
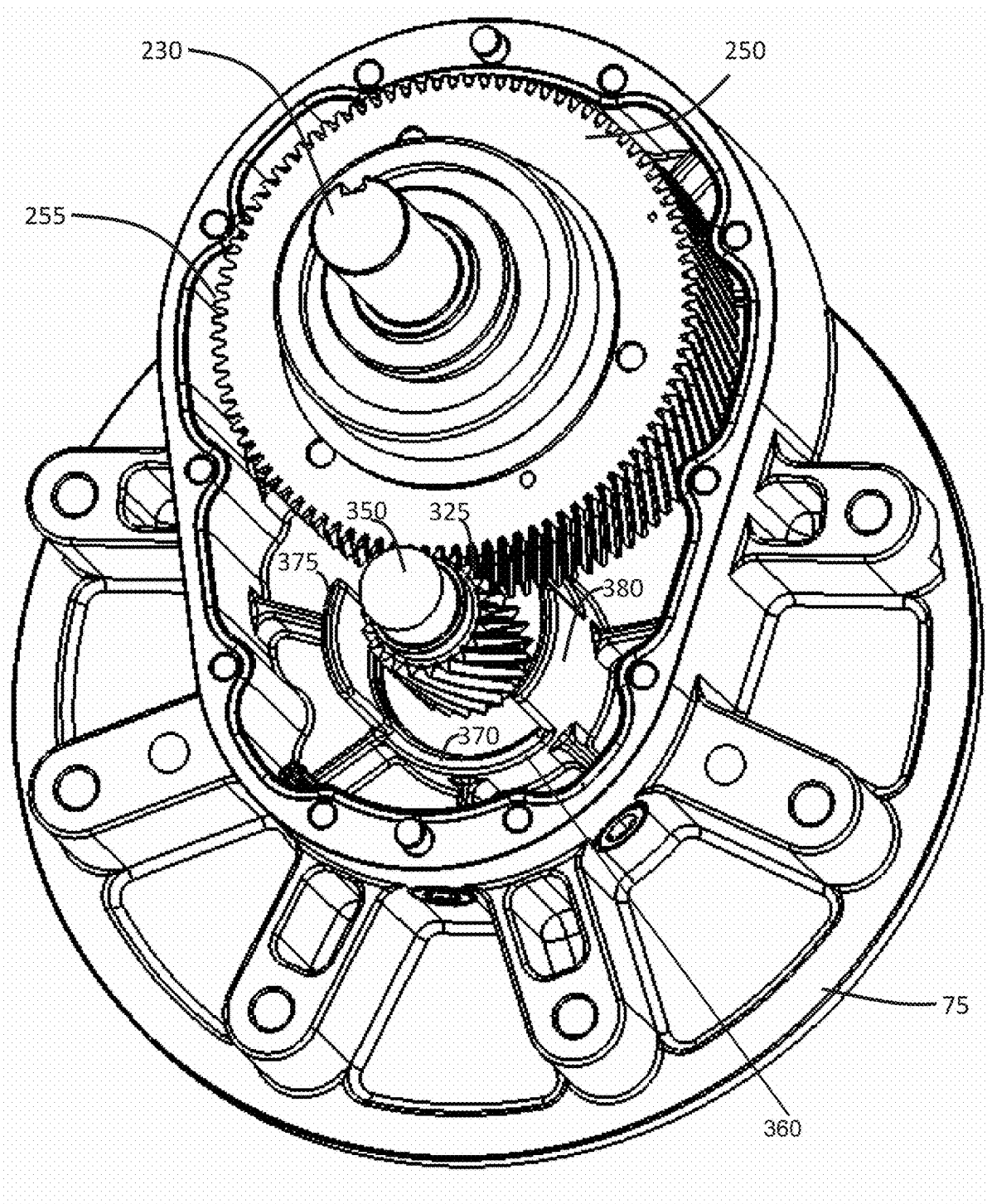
FIG. 21 illustrates a top perspective view of a gear housing with assembled input gear and impeller gear with oil guides in accordance with some embodiments of the invention.
Figure 22:
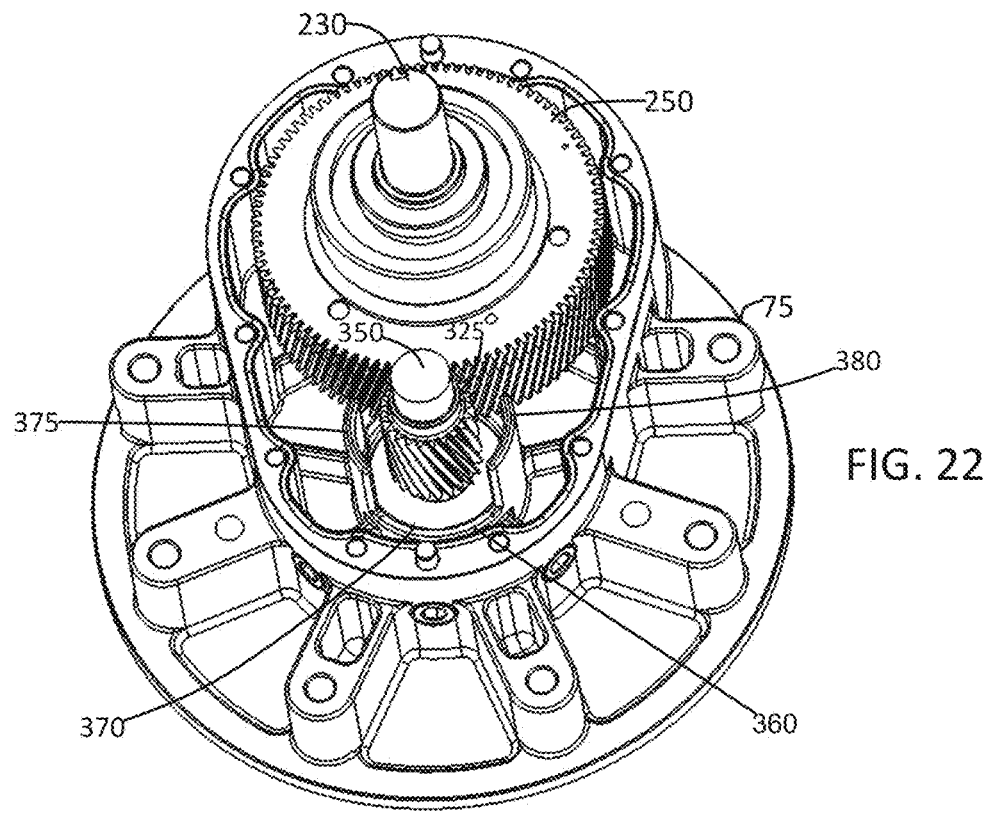
FIG. 22 illustrates a top front perspective view of a gear housing with assembled input gear and impeller gear with oil guides in accordance with some embodiments of the invention.
Figure 23:
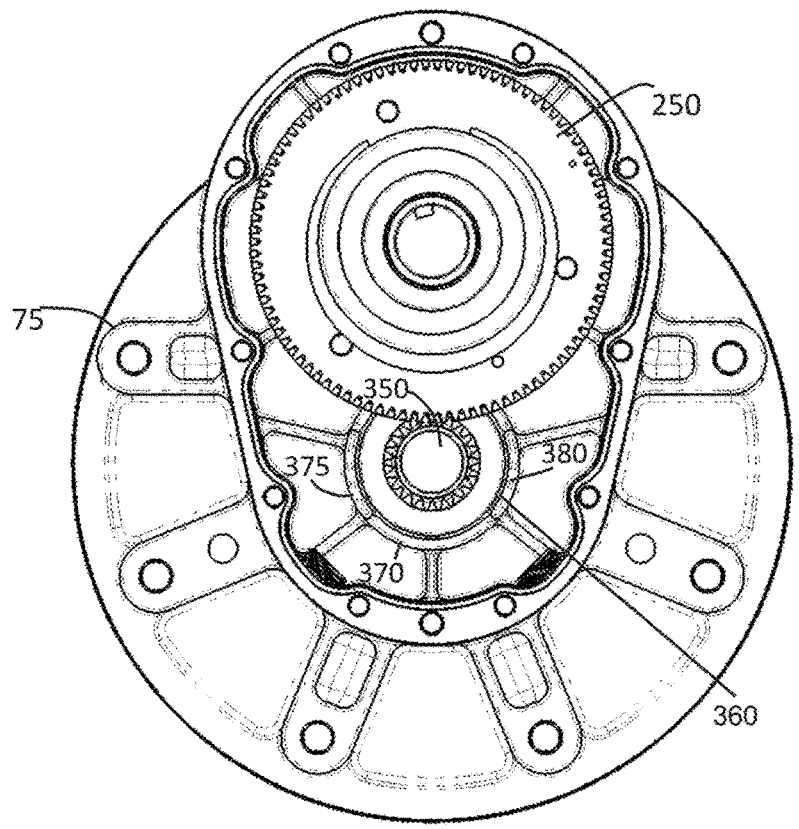
FIG. 23 illustrates a top view of a gear housing with assembled input gear and impeller gear with oil guides in accordance with some embodiments of the invention.

Some embodiments of the invention include one or more structures to guide flow of oil or other lubricant within the housing 25 of the supercharger 10. For example, FIG. 21 illustrates a top perspective view of a gear housing 75 with assembled input gear 250 and impeller gear 325 with oil guide 360 in accordance with some embodiments of the invention. Further, FIG. 22 illustrates a top front perspective view of the gear housing 75 with assembled input gear 250 and impeller gear 325 with oil guide 360 in accordance with some embodiments of the invention, and FIG. 23 illustrates a top view of a gear housing 75 with assembled input gear 250 and impeller gear 325 with oil guide 360 in accordance with some embodiments of the invention. As illustrated in FIGS. 21-23, in some embodiments, the oil guide 360 can be coupled to or can extend from the gear housing 75 towards the upper housing 27. In some embodiments of the invention, the oil guide 360 can comprise a base wall 370 extending at least partially around the impeller gear 325.

In some embodiments, the base wall 370 can comprise a curved wall as shown. In some embodiments, some portions of the base wall 370 can extend away from the gear housing 75 and towards the lower housing 29 and upper housing 27. For example, in some embodiments, the base wall 370 can include one or more coupled guide walls extending away from the gear housing 75. In some embodiments, the base wall 370 can include a coupled first guide wall 375 and/or a second guide wall 380. In some embodiments, the first guide wall 375 and/or the second guide wall 380 can extend circumferentially at least partially around the impeller gear 325. In some embodiments, the first guide wall 375 and/or the second guide wall 380 can extend at least a partial axial length of the impeller shaft 350. Further, in some embodiments, the first guide wall 375 and/or the second guide wall 380 can extend at least a partial axial length of the impeller gear 325. In the non-limiting example of FIGS. 21-23, the first guide wall 375 and/or the second guide wall 380 can comprise an axial length about equal to the axial length of the impeller gear 325. In some other embodiments, the first guide wall 375 and/or the second guide wall 380 can comprise an axial length less than the axial length of the impeller gear 325. In some further embodiments, the first guide wall 375 and/or the second guide wall 380 can comprise an axial length more than the axial length of the impeller gear 325.

Any of the embodiments described herein can form part of a centrifugal or centrifugal-type supercharger. In other embodiments, any of the embodiments described herein can form part of a screw-type supercharger or a roots-type supercharger. Moreover, any of the embodiments described herein can form part of a positive displacement fluid pump.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A supercharger comprising:
a housing including a scroll-shape upper housing at one end and a gear housing at an opposite end;
an output aperture defined by the upper housing;
a compression chamber at least partially surrounded by at least a portion of the upper housing;
an impeller at least partially positioned in the compression chamber, the impeller coupled to or integral with an impeller shaft; and
an interchangeable inlet extending from the housing, the inlet defining an inlet aperture fluidly coupled to the compression chamber; and
an anti-backlash gear coupled to an input gear for coaxial rotation therewith, whereby portions of both the anti-backlash gear and the input gear are configured and arranged to simultaneously engage an impeller gear coupled to or integral with the impeller shaft to reduce backlash.

2. The supercharger of claim 1, wherein the inlet is defined by an interchangeable inlet constrictor and the input gear and the anti-backlash gear coupling includes springs positioned in recesses.

3. The supercharger of claim 2, wherein inlet constrictor comprises an inner wall defining an inlet region and outlet region, the slope of the inner wall defined by an angle from a plane parallel with the face of the outlet region.

4. The supercharger of claim 3, wherein the slope is 78°.

5. The supercharger of claim 3, wherein the slope is less than 90°.

6. The supercharger of claim 1, wherein the impeller shaft is coupled to or integral with an impeller gear positioned adjacent at least one oil guide, wherein at least a portion of the at least one oil guide extends at least partially around the impeller gear.

7. The supercharger of claim 6, wherein the at least one oil guide comprises a curved base wall coupled to or extending from the gear housing towards the upper housing, and extending at least partially around the impeller gear.

8. The supercharger of claim 7, where the base wall includes one or more coupled guide walls extending away from the gear housing, wherein at least one of the one or more coupled guide walls at least partially surrounds the impeller gear and comprises an axial length about equal to the axial length of the impeller gear.

9. The supercharger assembly of claim 1, wherein the anti-backlash gear and the input gear portions engaging the impeller gear comprise substantially the entirety of the engagement surfaces of the anti-backlash gear and the input gear gear.

10. A supercharger comprising:
a housing including an output aperture;
a compression chamber at least partially surrounded by at least a portion of the housing;
an impeller at least partially positioned in the compression chamber, the impeller coupled to or comprising an impeller shaft including an impeller gear;
an anti-backlash gear coupled for coaxial rotation with an input gear, the input gear including springs positioned in recesses; and
an interchangeable inlet constrictor defining an inlet aperture, the inlet aperture fluidly coupled to the compression chamber.

11. The supercharger of claim 10, wherein inlet constrictor is coupled to or includes an edge lip defining an inlet diameter of the inlet aperture.

12. The supercharger of claim 10, wherein the inlet constrictor includes an outlet region comprising an aperture with an outlet diameter, the outlet diameter being circumferentially defined by an interface between a bottom surface and an inner wall of the inlet constrictor.

13. The supercharger of claim 12, wherein the inner wall is sloped by an angle from a plane parallel with the face of the outlet region.

14. The supercharger of claim 13, wherein the angle is 78°.

15. The supercharger of claim 13, wherein the angle is less than 90°.

16. A supercharger assembly comprising:
a housing including an output aperture;
a compression chamber at least partially surrounded by at least a portion of the housing;
an impeller at least partially positioned in the compression chamber, the impeller coupled to or including an impeller shaft including a coupled or integrated impeller gear;

an inlet aperture defined by an interchangeable inlet constrictor coupled to an inlet wall of the inlet aperture, the inlet constrictor comprising an inner diameter defining an inlet region at one end and an outlet diameter at an opposite end, wherein the inlet constrictor is configured to be swapped with another inlet constrictor comprising a different inner diameter;

an anti-backlash gear coupled with an input gear, the input gear including springs positioned in recesses; and at least one oil guide proximate the impeller gear.

17. The supercharger assembly of claim 16, wherein the at least one oil guide comprises a curved wall coupled to at least a portion of the housing and at least partially surrounding the impeller gear and extended at least a partial axial length of the impeller gear.

18. The supercharger assembly of claim 16, wherein the at least one oil guide comprises one or more coupled guide walls at least partially surrounding the impeller gear and extending at least a partial axial length of the impeller shaft.

19. The supercharger assembly of claim 16, wherein the inlet constrictor comprises a threaded outer surface comprising a thread complementary to a thread of the inlet wall.

20. The supercharger assembly of claim 16, wherein the inner diameter is smaller than the outlet diameter.

* * * * *